(12) United States Patent
Kotton

(10) Patent No.: US 9,678,805 B2
(45) Date of Patent: Jun. 13, 2017

(54) LOCATION-BASED COMPONENT DEPLOYMENT FOR COMPOSITE APPLICATIONS

(75) Inventor: Gary Kotton, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 196 days.

(21) Appl. No.: 13/607,596

(22) Filed: Sep. 7, 2012

(65) Prior Publication Data

US 2014/0075433 A1    Mar. 13, 2014

(51) Int. Cl.
*G06F 9/455* (2006.01)
*G06F 9/50* (2006.01)

(52) U.S. Cl.
CPC ........ *G06F 9/5083* (2013.01); *G06F 9/45558* (2013.01); *G06F 2009/4557* (2013.01)

(58) Field of Classification Search
USPC .............................................................. 718/1
See application file for complete search history.

(56) References Cited

U.S. PATENT DOCUMENTS

| | | | |
|---|---|---|---|
| 2007/0160072 A1* | 7/2007 | Thalanany | H04W 36/30 370/401 |
| 2008/0225718 A1* | 9/2008 | Raja et al. | 370/235 |
| 2008/0256082 A1* | 10/2008 | Davies et al. | 707/10 |
| 2013/0055260 A1* | 2/2013 | Zlotkin | 718/1 |

* cited by examiner

*Primary Examiner* — Emerson Puente
*Assistant Examiner* — Steven Do
(74) *Attorney, Agent, or Firm* — Lowenstein Sandler LLP

(57) ABSTRACT

A method and system for deploying a component of a composite application in a data center. An example method includes receiving access data from a traffic manager implementing global load balancing, where the access data is related to client accesses to a composite web application including multiple components hosted by virtual machines in a virtualization infrastructure. The method further includes determining, based on the access data, determining that one of the components of the composite web application receives client accesses that exceed a threshold, identifying a new geographic location for the client accesses that exceed the threshold, instructing the virtualization infrastructure to deploy a new virtual machine at the new geographic location, the deployed virtual machine implementing the determined component of the composite web application, and providing information pertaining to the deployed virtual machine to the traffic manager.

15 Claims, 4 Drawing Sheets

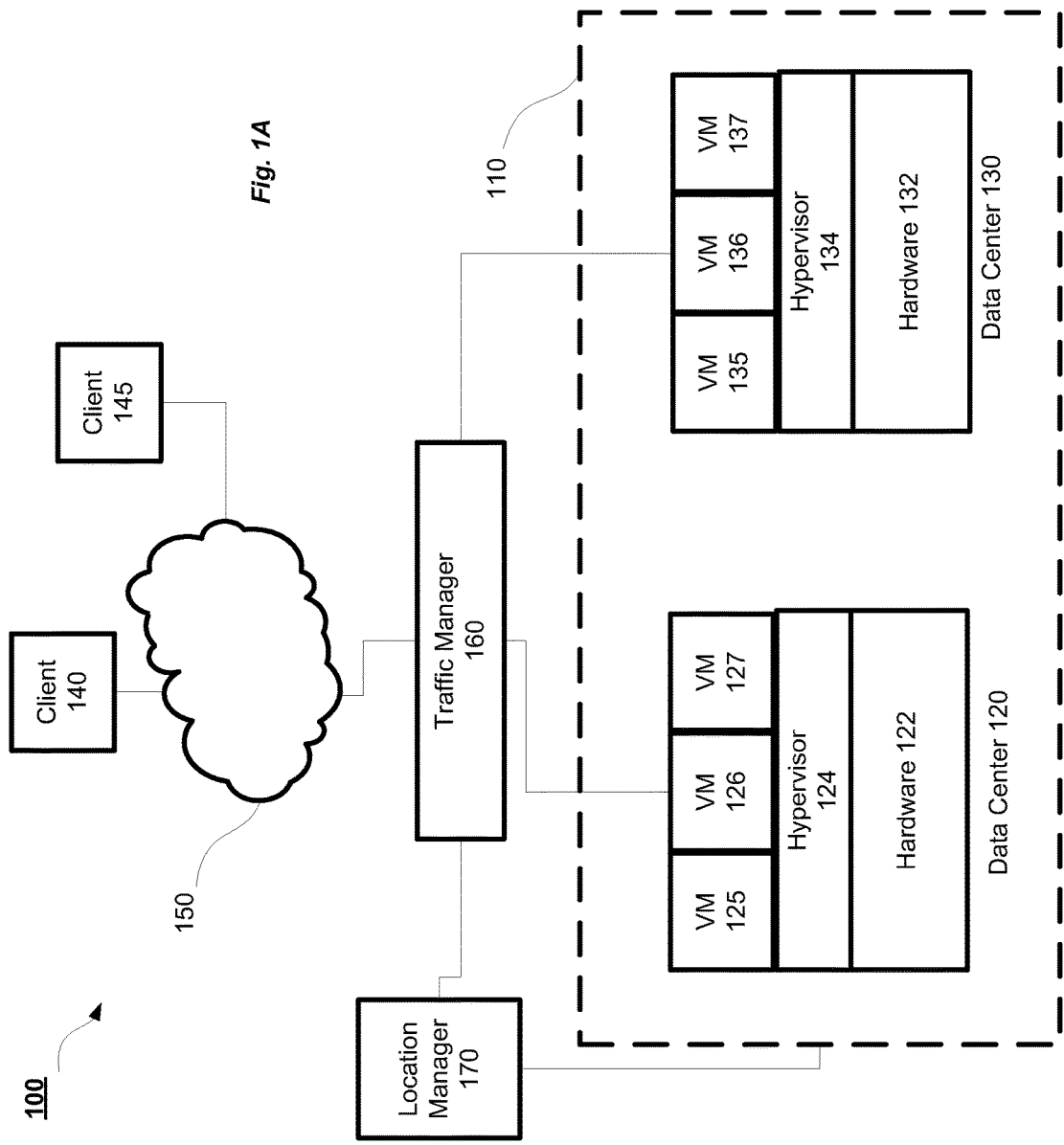

Plus, remove old VM in effect moving it; delploy in existing data center or lease space page content …

LOCATION-BASED COMPONENT DEPLOYMENT FOR COMPOSITE APPLICATIONS

TECHNICAL FIELD

Embodiments of the invention relate generally to software provisioning and, more specifically, relate to a mechanism for provisioning a composite application.

BACKGROUND

Global server load balancing—sometimes referred to simply as global load balancing—is a technology that allows Internet traffic to be distributed among different data-centers located at different locations of the planet. This technology is highly efficient in avoiding local downtimes. There is usually a master load balancer which monitors the health and responsiveness of "slave" sites. Web requests—such as HTTP requests—to a web site or web server are, whenever possible, directed by the load balancer to the data center containing the target server or the request that is geographically closest to the requestor client.

The global load balancer can use domain name system (DNS) resolution to redirect the requests and other traffic between the globally distributed data centers. In this manner, web servers, web sites, and other such services (such as application servers) that are closer to the requestor can be used, which in turn reduces latency and request response times. Another such scheme to use data geographically closer to the requestor is a content delivery network (CDN), which is a third party that hosts static data for a web site in multiple locations, and requests for such hosted data are directed to the geographically nearest CDN node hosting the requested data.

However, conventional global server load balancers and content delivery networks direct traffic to existing servers. Such global load balancers and content delivery networks are not typically capable of instantiating new servers at new geographic locations to direct traffic to.

BRIEF DESCRIPTION OF THE DRAWINGS

Embodiments of the invention will be understood more fully from the detailed description given below and from the accompanying drawings of various embodiments of the invention. The drawings, however, should not be taken to limit the invention to the specific embodiments, but are for explanation and understanding only.

FIG. 1A is a block diagram of a network environment for implementing a location manager according to one embodiment of the present invention.

DETAILED DESCRIPTION

Figure 1B:
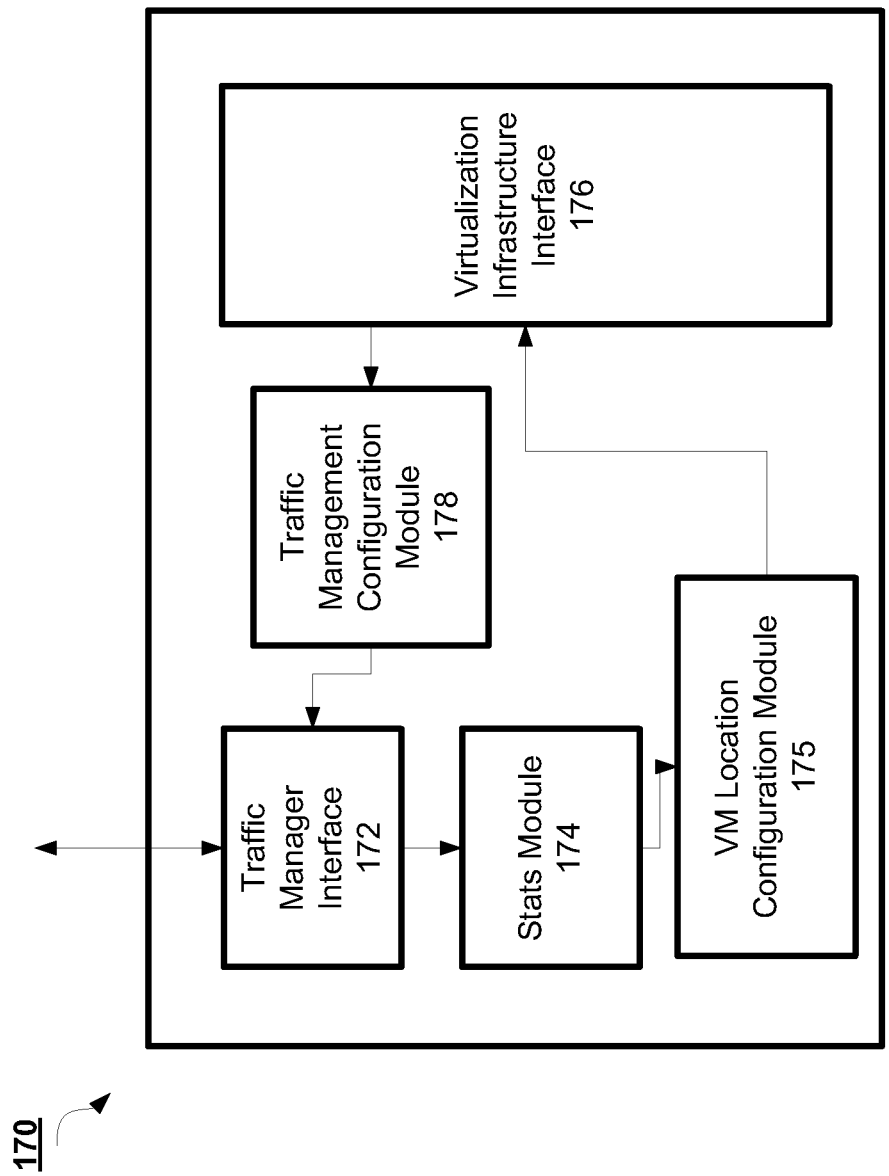
FIG. 1B is a block diagram of a location manager according to one embodiment of the present invention.

Embodiments of the invention provide a mechanism for deploying a component of a composite application in a data center geographically selected based on client access data. In embodiments of the invention, a system determines optimal locations to deploy components of a composite application. Additionally, the system may determine optimal locations to deploy a virtual infrastructure on which to deploy the components of the composite application. The system may then deploy the virtual infrastructure and/or the components to the identified optimal locations. The closer a source of data (e.g., a component of a composite application) is to a client, the better performance (and thus an end user experience) will be. One advantage of using such a virtual infrastructure is that the infrastructure itself (as well as the application components that run within the virtual infrastructure) may be created, migrated and destroyed with relative ease.

In one embodiment, a location manager is provided that receives access data from a traffic manager implementing global load balancing, where the access data is related to client accesses to a composite web application including multiple components hosted by virtual machines in a virtualization infrastructure. Based on the access data, the location manager determines that one of the components of the composite web application receives client accesses that exceed a threshold, and identifies a new geographic location for the client accesses that exceed the threshold. The location manager further instructs the virtualization infrastructure to deploy a new virtual machine at the new geographic location, the deployed virtual machine implementing the determined component of the composite web application, and provides information pertaining to the deployed virtual machine to the traffic manager. As a result, local downtimes are avoided and the operation of the composite application is improved.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

FIG. 1A is a block diagram of a network architecture 100 in which embodiments of the invention may operate. The network architecture 100 includes a virtualization infrastructure 110 of an organization that spans multiple data centers. For simplicity, only two data centers are shown. Data center 120 may be located in one geographic area (for example Europe) and data center 130 may be located in another geographic area (for example East Coast USA).

Data center 120 includes various host machines ("hosts") such as server machines, routers, personal computers, etc. Each host contains hardware resources 122 and various processing and communications resources. The virtualization infrastructure 110 can include various servers and controllers not shown for simplicity (such as a cloud controller, a provisioning server, etc) that enable the data center 120 to deploy a hypervisor 124 on each host and to deploy virtual machines 125-127 using the hypervisor 124 (also known as a virtual machine monitor (VMM)). In one embodiment, hypervisor 124 is a component of a host operating system (OS). Alternatively, the hypervisor 124 may run on top of a host OS, or may run directly on host hardware without the use of a host OS. The hypervisor 124, though typically implemented in software, may emulate and export a bare machine interface to higher level software. Such higher level software may comprise a standard or real-time operating system (OS), may be a highly stripped down operating environment with limited operating system functionality, may not include traditional OS facilities, etc. The hypervisor 124 presents to other software (i.e., "guest" software) the abstraction of one or more virtual machines (VMs).

Data center 130 can be implemented in a manner similar to data center 120. For example, data center 130 may include one or more hypervisors 134 running on hardware resources 132. Such hardware resources 132 may include host machines arranged in a cluster. Hypervisor 134 may deploy and manage virtual machines 135, 136, 137.

The virtualization infrastructure 110 can be used to provide various composite services (also known as composite applications). A composite application is an application that is installed on multiple machines (e.g., on multiple virtual machines). In the case of virtual machines, the virtual machines may all run on the same data center 120, 130, or may run on different data centers at different geographic locations. Each component of the application may be installed on a virtual machine optimized for the component.

In one embodiment, a single component of the composite application and the virtual machine that it runs in may make up a virtual appliance. A virtual appliance may be a virtual machine image file that includes a preconfigured operating system environment and a single application (e.g., a component of the composite application). The virtual appliance may simplify the delivery, setup and operation of that single application. The virtual appliance may be a subset of a virtual machine. Virtual appliances may be used for deploying network applications, such as firewalls, virtual private networks, wide area network (WAN) optimizers, web servers, application servers, database management systems, and so forth.

The composite application and its components may be made up of several software "applications," so the composite application will sometimes be referred to as a composite service. For example, a composite application or service can be a Web application, such as a news site, a social networking site, or a blog site. Such a composite application can have various components. For example, a 3-tier application will have an interface tier (Web server), a business logic tier (application server) and a data tier (database management system). Various other tiers are possible, including an orchestration tier to distribute and manage jobs between multiple servers.

For example, a composite service may consist of a database server hosted—in data center 120—on virtual machine 125, an application server hosted on virtual machine 126, and a web server hosted on virtual machine 127. In data center 130, another application server for the composite service can be hosted on virtual machine 135 and another web server for the composite service can be hosted on virtual machine 136. In another example, data center 120 may host a virtual appliance associated with a composite application (e.g., an application server of the composite application), and data center 130 may host a second virtual appliance associated with the composite application (e.g., a web server of the composite application).

In one embodiment, clients 140 and 145 are connected to the virtualization infrastructure 110—and ultimately to the virtual machines—via a network 150, which may be may be a private network (e.g., a local area network (LAN), a wide area network (WAN), intranet, or other similar private networks) or a public network (e.g., the Internet). Each client 140, 145 may be a mobile device, a PDA, a laptop, a desktop computer, or any other computing device.

In one embodiment, in addition to using a virtualization infrastructure 110, global load balancing is implemented using a traffic manager 160. Global load balancing allows Internet traffic to be distributed among different data-centers located at different locations of the planet and can use domain name system (DNS) resolution to redirect the requests and other traffic between the globally distributed data centers. The traffic manager 160 may reside on a separate machine (e.g., a server machine, a router, a desktop computer, etc.) coupled to the data centers 120, 130 over a network (e.g., a local area network (LAN)). The traffic manager 160 receives the requests bound for the composite service—for example a request to the web server—and routes it to the appropriate data center. In an example, assume that data center 120 is located in Germany, data center 130 is located in New York, and data centers 120 and 130 include VMs 127 and 136, respectively, running web servers that are components of a composite service. If client 140 is located in Germany and client 145 is located in New York, then a web request from client 140 may be routed to the web server residing on virtual machine 127 in data center 120 1, and a web request from client 145 may be routed to the web server residing on virtual machine 136 in data center 130.

The traffic manager 160 maintains various access statistics as part of its operation. For example, the session table of the traffic manager 160 used to maintain stable sessions during load balancing will contain statistical information about the clients accessing the various virtual machines to which the traffic manager 160 is configured to rout traffic. In other embodiments, the traffic manager 160 can be configured to maintain access statistics associated with client access.

Access statistics can include historic, recent, and trending location of accesses. Some example access statistics can be: total accesses per region per timeframe (e.g., 454 accesses from Germany in the last hour), traffic change per region per timeframe (e.g., a 30% increase in accesses from New York in the last week), and other such statistics.

In one embodiment, a location manager 170 is configured to collect the access statistics from the traffic manager 160. The location manager 170 may reside on the same machine as the traffic manager 160 or on a different machine (e.g., a server machine, a router, a desktop computer, etc.) coupled to the traffic manager 160 and the data centers 120, 130 over a network (e.g., a local area network (LAN)). In one embodiment, the traffic manager 160 provides raw access data—such as from a session table—to the location manager 170. Location manager 170 may in turn use the raw access data to calculate higher level statistics, such as the statistics mentioned above (e.g., 30% increase in traffic to web server originating from North America in the last day). The location manager 170 is able to determine an optimal location to which to deploy components of the composite application using the collected and/or computed statistics. Location manager 170 may determine both where to deploy components of the composite application and how to deploy the components.

In one embodiment, the location manager 170 uses the collected and generated access statistics to dynamically deploy (or move) entire components of a composite service to locations where they are needed. In this manner, instead of directing traffic to preexisting nearby servers, the servers themselves are dynamically deployed—using the virtualization infrastructure 110—to where the accesses originate. The servers can be deployed on one or more different virtual machines. In addition, the location manager may indicate to a service provider an optimal location at which to deploy components of the composite application.

In one embodiment, location manager 170 determines an optimal data center that is already integrated into the virtualization infrastructure 110 to deploy a component of the application to. In a further embodiment, location manager 170 may notify a service provider that the virtualization infrastructure 110 should be deployed to a new location. In response, an administrator may install new hardware at the designated location and install a hypervisor on the new hardware to integrate the new hardware into the virtualization infrastructure 110 (or to generate a new virtualization infrastructure that interacts with the location manager 170). Alternatively, location manager 170 may cause compute and/or storage resources to be purchased from a service provider (e.g., from Amazon's Elastic Compute Cloud (EC2®) or Rackspace®). Location manager 170 may install a hypervisor on the purchased resources and configure those resources for integration into an existing virtualization infrastructure or to establish a new virtualization infrastructure. In one embodiment, location manager 170 automatically selects new data centers, installs software on those data centers, configures the software, and extends the virtualization infrastructure 110 to those new data centers. As a result, a new data center at the determined location may be integrated into the virtualization infrastructure 110.

In an example, the composite service may be a news website. Because of an important local election, many residents of New York state log on to the news website to read articles, election coverage, and comment. This may cause an increase in traffic from New York and an increased amount of traffic being directed to data center 130 by the traffic manager. The location manager 170 can detect this increased traffic, and instruct the virtualization infrastructure 110 to deploy another web server for the web site on virtual machine 137 that was not previously deployed.

Alternatively, for example, the East Coast data center 130 may not be used by any components of the news website, because the news website is a European news organization. However, the increased traffic from New York can result in the location manager 170 deploying the virtualization infrastructure 110 to data center 130 and/or instructing the virtualization infrastructure to deploy a web server for the new website on one or more virtual machines in the East Coast data center 130 to improve the user experience of those clients accessing the site from New York. As another example, traffic to the news website from Asia might increase to a significant level, where before it was regarded as insignificant. If the virtualization infrastructure 110 also has a data center in Asia (not shown), a web server can be deployed on one or more virtual machines at the Asia data center, where the composite application had no deployed components before. Additionally, location manager 170 may deploy the virtualization infrastructure 110 to the Asia data center.

Once the component of the composite service has been deployed on an existing or new virtual machine, the virtualization infrastructure 110 can update the location manager 170 about the IP address and other properties of the newly deployed component of the composite service and/or the respective virtual machine(s). The location manager 170 can then update the traffic manager 160 with the information about the virtual machine and the component it hosts to update routing tables and a DNS resolver of the traffic manager 160. In another embodiment, the virtualization infrastructure 110 can update the traffic manager 160 about the virtual machine and the component directly.

In the embodiment described, the virtualization infrastructure 110 included a data center that was geographically near the increased access traffic. If this is not the case, the location manager 170 can still use access data and statistics to deploy components in the geographically closest data center. For example, increased traffic from Mongolia could result in a deployment in the European data center 120, as it is geographically preferable of the available options.

As mentioned, the virtualization infrastructure 110 may also be extended to a new data center that is geographically near the increased traffic. For example, if a cloud provider has a data center in Asia, then increased traffic from Mongolia can result in the deployment of a hypervisor and/or a virtual machine in that Asian data center.

In one embodiment, location manager 170 has information on characteristics of all virtual environments and underlying hardware and software in those virtual environments that it interacts with. This may include information on underlying hardware (e.g., processor resources, memory resources, etc.), information on a host operating system, information on a hypervisor, information on virtual machines, and so forth. Each component of a composite application (e.g., each virtual appliance) may specify configuration parameters, such as minimum resources, a type of hypervisor that it will function on, and so forth. Location manager 170 may use the information on the characteristics of the virtual environments when determining a data center to deploy a component of a composite application to. For example, even if a particular data center is a closest to a source of incoming traffic, location manager 170 may deploy a virtual appliance to a secondary data center that is more distant if that secondary data center has greater available resources.

As discussed above, location manager 170 may interact with a virtual environment that spans multiple different data centers 120, 130, and may additionally interact with multiple different virtualization environments. For example, location manager 170 may interact with a first virtualization environment that uses an underlying hypervisor provided by VMWare®, and with a second virtualization environment that uses an underlying hypervisor provided by Red Hat®. Location manager 170 may have information on the underlying software and hardware in each such virtualization environment.

Furthermore, in the examples above a new virtual machine is deployed to host a component due to increased traffic from a geographical area. This may include instructing a host to perform provisioning, copying an application to the host, booting the application, and so forth. This may also include performing a live migration of a virtual machine that includes the application (e.g., of a virtual appliance). Subsequent to, or during, deployment of the component for the composite application, location manager 170 may update traffic managers 160 to ensure that traffic will reach the newly deployed component. Note also that decreases in access from a geographic area can lead to the deactivation of components and virtual machines as well.

While various embodiments are described in terms of the environment described above, the facilities and systems may be implemented in a variety of other environments and combinations. For example, the location manager 170 itself may be hosted by virtual machine of the virtualization infrastructure 110.

FIG. 1B is a block diagram illustrating a location manager 170 in more detail according to an embodiment of the invention. The location manager 170, according to one embodiment, includes a traffic manager interface 172 that can communicate with the traffic manager 160. The traffic manager interface 172 can obtain access data from the traffic manager 160 by periodically requesting raw access data or access related statistics from the traffic manager 160.

In one embodiment, the location manager 170 also includes a statistics module 174 that calculates the access statistics that are used to predict or determine virtual machine and/or component deployment. The statistics module 174 may maintain historic records of access statistics to generate higher level statistical calculations as well, such as access trends over time. As explained above, an example statistical analysis from the statistics module 174 may be: total access to web server this month: 133423453; percentage access change this week: +10%; percentage access change this day: +20%.

The access statistics are then used by the virtual machine deployment module 175 to determine whether and where to deploy additional virtual machines implementing a component of the composite application or whether and where to deactivate virtual machines implementing a component of the composite application. In one embodiment, the virtual machine deployment module 175 can compare the access statistics to various thresholds to see whether and where components should be deployed. For example, if the number of accesses to the web server from the geographic area covered by the East Coast data center 130 exceeds a certain threshold, the virtual machine deployment module 175 can determine that a new web server should be deployed on a virtual machine in the East Coast data center.

If such a determination is made, the virtual machine deployment module 175 can send an instruction to carry out the deployment to the virtualization infrastructure 110 via the virtualization infrastructure interface 176. This may include loading a virtual machine including a specific component of the composite application at an identified data center. In one embodiment, the virtualization infrastructure interface 176 also receives the configuration information of the newly deployed virtual machine and component (or the deactivated one).

Virtual machine deployment module 175 may additionally deploy the virtualization infrastructure 110 to new data centers and/or locations as described above. This may include interfacing with a cloud service provider to reserve compute resources, install a hypervisor on those compute resources, and/or otherwise set up the virtualization infrastructure on those compute resources. Once a virtualization environment is newly established, virtual machine deployment module 175 may deploy virtual machines to that newly deployed virtualization infrastructure as described above.

In one embodiment, the location manager 170 also includes a traffic management configuration module 178 that receives the information about the new component residing on the newly deployed virtual machine and generates an instruction to update the traffic manager with the new information (e.g., the IP address of the newly deployed virtual machine. This instruction can then be sent to the traffic manager 160 using the traffic manager interface 172.

Figure 2:
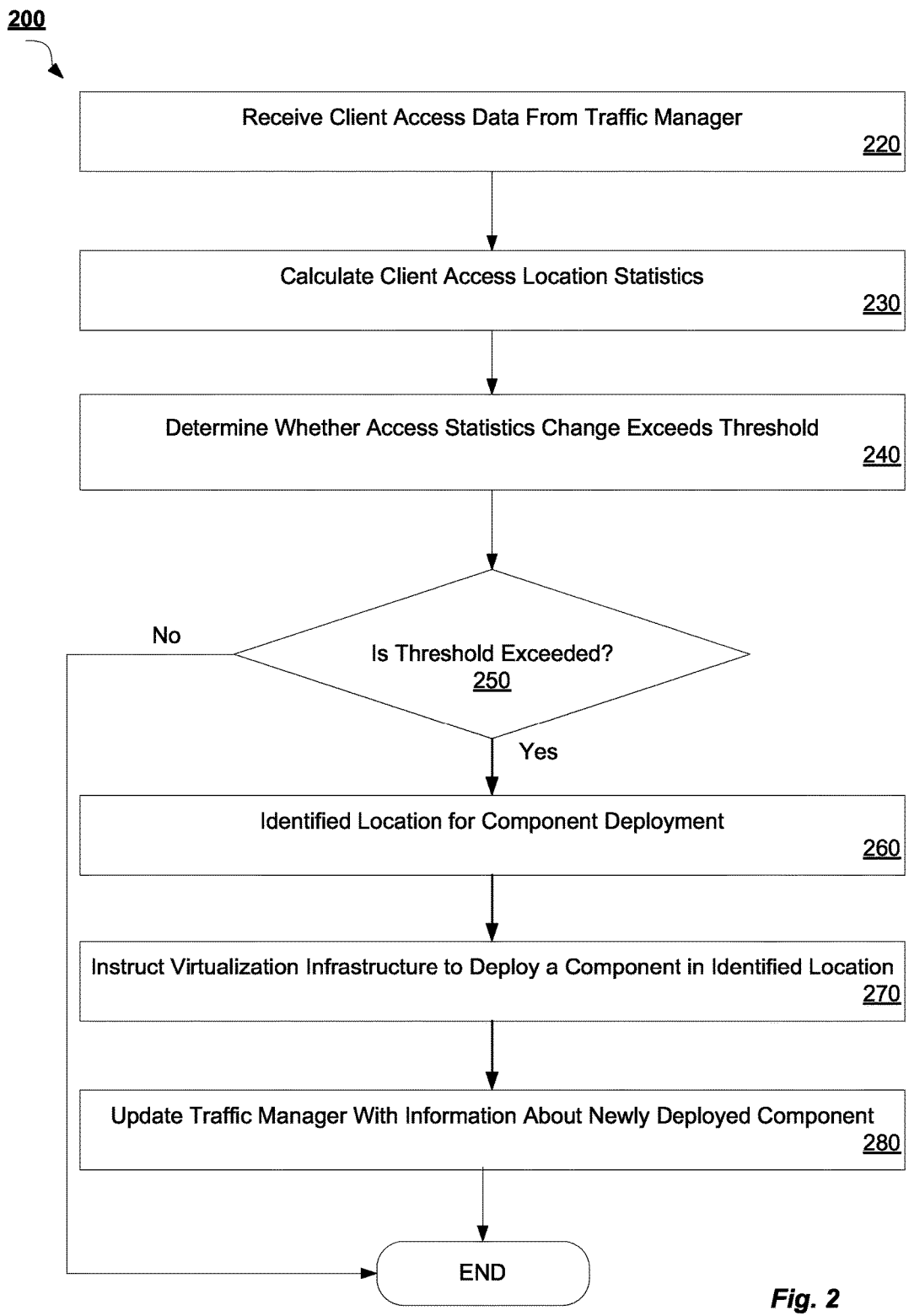
FIG. 2 is a flow diagram illustration virtual machine deployment according to one embodiment of the present invention.

FIG. 2 is a flow diagram illustrating a method 200 for deploying a component of a composite web application using access statistics. Method 200 may be performed by processing logic that may comprise hardware (e.g., circuitry, dedicated logic, programmable logic, microcode, etc.), software (such as instructions run on a processing device), firmware, or a combination thereof. In one embodiment, method 200 is performed by location manager 170 of FIG. 1.

Method 200 begins at block 220 with receiving client access data from the traffic manager. The traffic manager can be a load balancer, a DNS server, or other such systems implementing global server load balancing. The client access data may be requested from the traffic manager on a real-time basis or periodically queried. The received traffic data may be timeframe limited (accesses since the last update, last week, etc), rolling window, or just an access of whatever access data the traffic manager has.

At block 230, client access location statistics are calculated from the access data. For example, certain internet protocol IP ranges may be identified as originating from a geographic area. Thus, raw access data can be used to calculate a client access statistic such as "X number of accesses from clients in North America." At block 240 and 250 it is determined whether the client access statistic—or multiple statistics—exceed one or more predetermined thresholds. If not exceeded, processing terminates and no action is taken. For example, if the threshold indicates that a minimum of 10,000 accesses per day from a geographic area (e.g., North America) are required before a web server is deployed, then 8,000 accesses in the last day will not satisfy the threshold.

If, however, the threshold is exceeded, then processing continues at block 260 with the identification of a location for deploying a new virtual machine. The location of the new virtual machine—in other words the geographic location of the host for the new virtual machine—is based on the access statistics (e.g., an exceeding number of accesses from a specific location). For example, if an average of daily accesses from the West Coast over a past week exceeds a predefined threshold, a Nevada data center can be selected as the identified location.

At block 262, processing logic determines whether the identified location includes a virtualization infrastructure. If the location does not include the virtualization infrastructure, the method continues to block 264, and the virtualization infrastructure is deployed to the identified location. Otherwise, the method proceeds to block 270.

At block 270, the virtualization infrastructure is instructed to deploy a virtual machine at the identified location and to provision the virtual machine to implement the target component of a composite application to which the accesses are bound. For example, the instruction can be to deploy a web server at the Nevada data center. Once the virtualization infrastructure completes the deployment of the new virtual machine, the IP address and other properties of the virtual machine, including its role in the composite application can be identified.

Then, at block 280, this information is used to update the traffic manager with the existence of the newly deployed virtual machine, so that—for example—future North American accesses to the web server of the composite application will be directed to the web server resident on the virtual machine being hosted in the Nevada data center. The processing then terminates, and begins anew when the latest client access data is received from the traffic manager.

Figure 3:
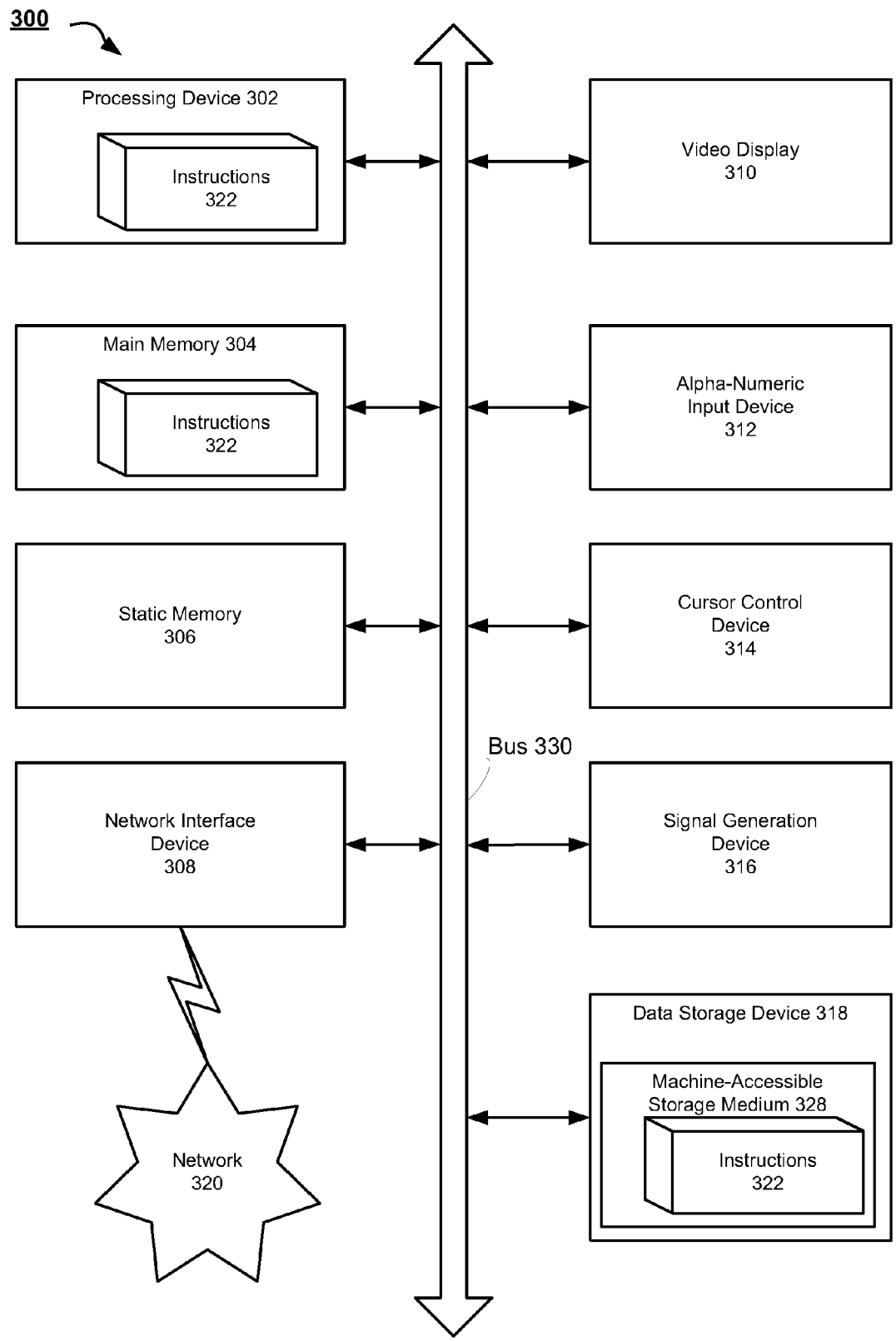
FIG. 3 illustrates a block diagram of one embodiment of a computer system.

FIG. 3 illustrates a diagrammatic representation of a machine in the exemplary form of a computer system 300 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 300 includes a processing device 302, a main memory 304 (e.g., read-only memory (ROM), flash memory, dynamic random access memory (DRAM) (such as synchronous DRAM (SDRAM) or DRAM (RDRAM), etc.), a static memory 306 (e.g., flash memory, static random access memory (SRAM), etc.), and a data storage device 318, which communicate with each other via a bus 330.

Processing device 302 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 302 may also be one or more special-purpose processing devices such as an application specific integrated circuit (ASIC), a field programmable gate array (FPGA), a digital signal processor (DSP), network processor, or the like. The processing device 302 is configured to execute the instructions 322 for performing the operations and steps discussed herein.

The computer system 300 may further include a network interface device 308. The computer system 300 also may include a video display unit 310 (e.g., a liquid crystal display (LCD) or a cathode ray tube (CRT)), an alphanumeric input device 312 (e.g., a keyboard), a cursor control device 314 (e.g., a mouse), and a signal generation device 316 (e.g., a speaker).

The data storage device 318 may include a machine-accessible storage medium 328 on which is stored instructions 322 embodying any one or more of the methodologies of functions described herein. For example, instructions 322 may be instructions to perform virtual machine deployment described with respect to FIG. 2. The instructions 322 may also reside, completely or at least partially, within the main memory 304 and/or within the processing device 302 during execution thereof by the computer system 300; the main memory 304 and the processing device 302 also constituting machine-accessible storage media.

The machine-readable storage medium 328 may also be used to store instructions to perform virtual machine deployment described with respect to FIG. 2, and/or a software library containing methods that call the above applications. While the machine-accessible storage medium 328 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Some portions of the detailed descriptions are presented above in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying", "receiving", "instructing", "providing", "caching", "comparing," "matching," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method comprising:
receiving, by a computer system, access data from a traffic manager implementing load balancing, the access data being related to client accesses of a plurality of clients from a plurality of geographic areas to a composite web application having a plurality of components hosted by a plurality of virtual machines managed in a virtualization infrastructure, wherein the access data indicates respective geographic areas for the client accesses;
determining, based on the access data, that one of the plurality of components of the composite web application receives, over a time period, a number of client accesses that exceeds a threshold, wherein the number of client accesses is from multiple clients of the plurality of clients in a geographic area of the plurality of geographic areas, and wherein the threshold defines, for the time period, a minimum number of client accesses for triggering a deployment of a new virtual machine for the determined component;
identifying a new geographic location for the determined component of the composite web application, wherein identifying the new geographic location comprises identifying the geographic area of the client accesses in view of the access data and finding a new geographic location proximate to the identified geographic area of increased traffic indicated by the access data;
installing, by a processing device of the computer system, a new hypervisor on compute resources at the new geographic location, establishing a new virtualization infrastructure comprising the new hypervisor at the new geographic location, and deploying the new virtual machine on the new hypervisor, the deployed virtual machine implementing the determined component of the composite web application; and
providing, to the traffic manager, information pertaining to the deployed virtual machine.

2. The method of claim 1, wherein identifying the geographic area comprises calculating client access location statistics based on the access data.

3. The method of claim 1, wherein the virtualization infrastructure comprises a plurality of data centers executing one or more hypervisors, and the new virtualization infrastructure comprises an additional data center executing the new hypervisor.

4. The method of claim 3, wherein identifying the new geographic location comprises identifying the additional data center.

5. The method of claim 1, further comprising receiving an internet protocol address of the deployed virtual machine from the virtualization infrastructure.

6. The method of claim 5, wherein the information pertaining to the deployed virtual machine comprises the internet protocol address of the deployed virtual machine and a role of the determined component in the composite application.

7. A non-transitory computer-readable storage medium having instructions that, when executed by a processing device, cause the processing device to:

receive, by a computer system, access data from a traffic manager implementing load balancing, the access data being related to client accesses of a plurality of clients from a plurality of geographic areas to a composite web application having a plurality of components hosted by a plurality of virtual machines managed in a virtualization infrastructure, wherein the access data indicates respective geographic areas for the client accesses;
determine, based on the access data, that one of the plurality of components of the composite web application receives, over a time period, a number of client accesses that exceeds a threshold, wherein the number of client accesses is from multiple clients of the plurality of clients in a geographic area of the plurality of geographic areas, and wherein the threshold defines, for the time period, a minimum number of client accesses for triggering a deployment of a new virtual machine for the determined component;
identify a new geographic location for the determined component of the composite web application, wherein identifying the new geographic location comprises identifying the geographic area of the client accesses in view of the access data and finding a new geographic location proximate to the identified geographic area of increased traffic indicated by the access data;
install, by the computer system, a new hypervisor on compute resources at the new geographic location, establish a new virtualization infrastructure comprising the new hypervisor at the new geographic location, and deploy the new virtual machine on the new hypervisor, the deployed virtual machine implementing the determined component of the composite web application; and
provide, to the traffic manager, information pertaining to the deployed virtual machine.

8. The non-transitory computer-readable storage medium of claim 7 wherein to identify the geographic area, the processing device is further to calculate client access location statistics based on the access data.

9. The non-transitory computer-readable storage medium of claim 7, wherein the virtualization infrastructure comprises a plurality of data centers executing one or more hypervisors, and the new virtualization infrastructure comprises an additional data center executing the new hypervisor.

10. The non-transitory computer-readable storage medium of claim 9, wherein identifying the new geographic location comprises identifying the additional data center.

11. The non-transitory computer-readable storage medium of claim 7, the processing device further to receive an internet protocol address of the deployed virtual machine from the virtualization infrastructure.

12. The non-transitory computer-readable storage medium of claim 11, wherein the information pertaining to the deployed virtual machine comprises the internet protocol address of the deployed virtual machine and a role of the determined component in the composite application.

13. A computing apparatus comprising:
a memory; and
a processing device, coupled to the memory, to:
receive access data from a traffic manager implementing global load balancing, the access data being related to client accesses of a plurality of clients from a plurality of geographic areas to a composite web application having a plurality of components hosted by a plurality of virtual machines managed in a virtualization infrastructure, wherein the access data indicates respective geographic areas for the client accesses;

determine, based on the access data, that one of the plurality of components of the composite web application receives, over a time period, a number of client accesses that exceeds a threshold, wherein the number of client accesses is from multiple clients of the plurality of clients in a geographic area of the plurality of geographic areas, and wherein the threshold defines, for the time period, a minimum number of client accesses for triggering a deployment of a new virtual machine for the determined component;

identify a geographic location for the determined component of the composite web application, wherein identifying the new geographic location comprises identifying the geographic area of the client accesses in view of the access data and finding a new geographic location proximate to the identified geographic area of increased traffic indicated by the access data;

install new hypervisor on compute resources at the new geographic location, establish a new virtualization infrastructure comprising the new hypervisor at the new geographic location, and deploy the new virtual machine on the new hypervisor, the deployed virtual machine implementing the determined component of the composite web application; and provide, to the traffic manager, information pertaining to the deployed virtual machine.

14. The computing apparatus of claim 13, wherein the processing device is further to calculate client access location statistics using the received access data, wherein the identified geographic location is selected based on the calculated client access location statistics.

15. The computing apparatus of claim 14, wherein the processing device is further to receive an internet protocol address of the deployed virtual machine from the virtualization infrastructure, and wherein updating the traffic manager comprises providing the internet protocol address of the deployed virtual machine and the role of the component in the composite application to the traffic manager.

* * * * *